United States Patent [19]

Madison et al.

[11] 3,909,477

[45] Sept. 30, 1975

[54] WARP-SIZING COMPOSITIONS AND YARNS SIZED THEREWITH

[75] Inventors: Norman L. Madison, Midland; Victor E. Meyer, Midland; Gerald P. Beaumont, Midland; Alfred R. Nelson, Bay City, all of Mich.

[73] Assignee: The Dow Chemical Company, Midland, Mich.

[22] Filed: June 27, 1973

[21] Appl. No.: 374,209

[52] U.S. Cl. ....... 260/29.7 H; 106/238; 260/29.6 H; 260/29.6 TA; 260/29.7 T; 260/29.7 TA
[51] Int. Cl.² .......................................... C08F 15/40
[58] Field of Search .. 260/29.7 H, 29.6 TA, 29.6 H, 260/29.7 T, 29.7 TA; 106/238; 117/139.5

[56] References Cited
UNITED STATES PATENTS
2,768,090   10/1956   Wittcoff et al...................... 106/238
FOREIGN PATENTS OR APPLICATIONS
740,498   8/1966   Canada
1,032,058   6/1966   United Kingdom OTHER PUBLICATIONS
*Encyclopedia of Poly. Sci. & Tech.* 12, 599, 610, 612–613.

Blackley, *High Poly. Latices I*, pp. 131, 374–378 (Applied Science, 1966).
Yeates, *Electropainting*, 2 ed. pp. 78–85, 101 (Draper, 1970).

*Primary Examiner*—Melvin Goldstein
*Assistant Examiner*—Thomas DeBenedictis
*Attorney, Agent, or Firm*—I. A. Murphy

[57] ABSTRACT

Aqueous warp sizing compositions and the sized yarns obtained by applying the new sizing composition to textile yarn, removing excess composition from the yarn, drying the resulting wet-sized yarn and separating the individual yarns (ends) from one another before or after drying. The novel aqueous sizing composition is a blend of a lubricant, a surfactant, a redispersible latex composition and various optional ingredients. The redispersible latex component comprises a blend of (a) a six-membered carbocyclic compound having two carboxyl substituents and which is soluble in aqueous alkaline media such as the disodium salt of 1,2,3,6-tetrahydrophthalic acid and (b) an aqueous colloidal dispersion of a film-forming carboxyl-containing polymer such as a copolymer of styrene, butadiene and acrylic acid.

12 Claims, No Drawings

WARP-SIZING COMPOSITIONS AND YARNS SIZED THEREWITH

BACKGROUND OF THE INVENTION

1. Field of the Invention

This invention is concerned with a new warp sizing composition and a process for using the new composition to provide improved sized yarns for weaving.

2. Description of the Prior Art

A procedure for treating yarns with a sizing agent to hold down loose fibers, prevent inter-fiber entanglement and protect the yarn from chafing during weaving has been known for over a century. Since the size is removed after the weaving operation, most prior art sizes have been water-soluble materials such as various starches, gelatin, polyvinyl alcohol, carboxymethyl cellulose, cellulose ethers, casein, salts of polyacrylic acid and various mixtures thereof. Water-soluble copolymers have also been used such as copolymers of styrene and maleic anhydride, of acrylonitrile and acrylic acid and of butadiene and methacrylic acid in the form of their alkali metal or ammonium salts. Some of these materials, such as sodium carboxymethyl cellulose and polyvinyl alcohol, require cooking, must be applied from a hot size bath and require high relative humidities to function properly on the loom. Some of the materials which have been suggested are difficult to remove from the fabric and/or are difficult to remove from the waste water from the desizing process.

SUMMARY OF THE INVENTION

The present invention provides a warp-sizing composition comprising a blend of a lubricant, a surfactant, and a redispersible latex composition comprising an aqueous colloidal dispersion of a film-forming copolymer of from about 1 percent to about 10 percent, preferably from about 3 percent to about 5 percent, of an $\alpha,\beta$-ethylenically unsaturated carboxylic acid and the balance of an essentially water-insoluble, ethylenically unsaturated monomeric composition and a six-membered carbocyclic compound having two vicinal carboxyl substituents which is soluble in aqueous alkaline media, in an amount effective to provide water-redispersibility of the copolymer residue obtained by drying the latex. The latex component for the warp sizing composition may be obtained by the additive method, i.e., by mixing the six-membered-ring carbocyclic compound with film forming latexes having a polymeric component containing the required amount of copolymerized ethylenically unsaturated carboxylic acid or they may be obtained by the in situ method wherein certain of the carbocyclic compounds can be formed in situ during emulsion polymerization of monomeric compositions (which must include an aliphatic conjugated diene) to prepare the latex. In the in situ preparation, from about 2.5 percent to about 13 percent, preferably from about 4 percent to about 8 percent, of fumaric acid or of a monomethyl, monoethyl or monopropyl ester of an $\alpha,\beta$-ethylenically unsaturated dicarboxylic acid, from about 10 percent to about 97.5 percent, preferably from about 20 percent to about 75 percent of an aliphatic conjugated diene and the balance of another copolymerizable, neutral, ethylenically unsaturated monomer are subjected to emulsion polymerization conditions at an acid pH. Sufficient water-soluble base-acting compound is added to the resulting latex product to provide a pH of from about 7 to about 14, preferably from about 8 to about 12.

The warp sizing compositions are applied to natural and synthetic yarns, e.g., continuous filament yarns, spun yarns or fasciated yarns, by passing the yarns through a size box or trough containing the warp-size composition, suitably at ambient temperature, removing excess warp-size for example with squeeze rolls and drying the thus treated yarn over heated rolls or in an oven, separating the individual yarns (ends) from one another either before or after drying such as by a series of lease rods. The dried, sized individual yarns may then be wound on a loom beam then mounted on a loom, after which the individual ends are drawn into the desired pattern.

DESCRIPTION OF THE PREFERRED EMBODIMENTS

The sizing compositions of this invention require (a) a film-forming polymer which also has adhesive properties (b) a lubricant and (c) a surfactant and may contain various optional materials.

These film-forming, adhesive polymers used in the practice of this invention are in the form of latex compositions which may include part or all of the surfactant which is required for the sizing compositions. The latex compositions contain a mixture of a film-forming copolymer and a six-membered carbocyclic compound having two vicinal carboxyl substituents which is soluble in aqueous alkaline media and are prepared either by the addition of such a soluble carbocyclic compound to a preformed latex or by the in situ preparation of the carbocyclic compound and the copolymer comprising the latex by an emulsion polymerization process. For brevity, the methods are sometimes referred to hereinafter as the "additive method" when the carbocyclic compound per se is added either before, during, or after polymerizing the monomeric compounds of the latex and as the "in situ method" when the carbocyclic compound is formed during emulsion polymerization.

The six-membered carbocyclic compounds having two vicinal carboxyl substituents, i.e., compounds containing a ring composed of six carbon atoms having one carboxyl group attached to each of two adjacent ring-carbon atoms, are phthalic acid (ortho-phthalic acid) and modified phthalic acid compounds which are soluble in aqueous alkaline media, i.e., in an aqueous solution containing sufficient water-soluble base to maintain a pH greater than 7 and less than about 14. The term "six-membered" refers only to the number of carbon atoms in the carbocyclic ring. By the word "modified" in the term "modified phthalic acid compounds" is meant substitution of other substituents such as alkyl or halogen for hydrogens or ring-carbon atoms and/or different degrees of double-bond unsaturation of the carbocyclic ring; for example, phthalic acid per se is completely unsaturated, hexahydrophthalic acid is completely saturated whereas 1,2,3,6-tetrahydrophthalic acid and 1,3-cyclohexadiene-1,2-dicarboxylic acid have an intermediate degree of saturation. The six-membered carbocyclic compounds having two vicinal carboxyl substituents which are soluble in aqueous alkaline media are represented by phthalic acid,
3-methylphthalic acid,
4-methylphthalic acid, 4-methoxyphthalic acid,
3,4-dimethylphthalic acid,
3,4-dimethoxyphthalic acid,
3,4-dimethoxy-6-nitrophthalic acid,
4-methoxy-3,6-dimethylphthalic acid,
4,5-dimethoxyphthalic acid,
4,5-diethoxyphthalic acid,
4-chloro-5-methoxyphthalic acid
3,6-difluorophthalic acid,
tetrachlorophthalic acid,
tetrabromophthalic acid,
3-bromo-4-ethoxy-5-methoxyphthalic acid,
3-phenylphthalic acid,
4-benzylphthalic acid,
1,3-cyclohexadiene-1,2-dicarboxylic acid,
1,4-cyclohexadiene-1,2-dicarboxylic acid,
3-methyl-1,4-cyclohexadiene-1,2-dicarboxylic acid,
3-methyl-4,6-cyclohexadiene-1,2-dicarboxylic acid,
3-methyl-3,6-cyclohexadiene-1,2-dicarboxylic acid,
4-methyl-1,4-cyclohexadiene-1,2-dicarboxylic acid,
5-methyl-2,4-cyclohexadiene-1,2-dicarboxylic acid,
3,4-dimethyl-1,4-cyclohexadiene-1,2-dicarboxylic acid,
3,4-dimethyl-4,6-cyclohexadiene-1,2-dicarboxylic acid,
1,2,3,6-tetrahydrophthalic acid, and
hexahydrophthalic acid.

In the additive method of preparation wherein the carbocyclic compound, as heretofore defined, is mixed with a pre-formed latex, there are many known latexes which are suitable in the practice of the invention. It is required that such latexes contain a copolymer of from about 1 percent to about 10 percent of an $\alpha,\beta$-ethylenically unsaturated carboxylic acid and a substantially water-insoluble ethylenically unsaturated monomeric composition wherein the copolymer is film-forming at temperatures below about 95°C, preferably below about 30°C, and has a particle size within the range of from about 500 Angstroms to about 10,000 Angstroms.

The $\alpha,\beta$-ethylenically unsaturated carboxylic acids may be monocarboxylic or polycarboxylic and ordinarily have from 3 to 6 carbon atoms although acids having a greater number of carbon atoms such as up to 10 may be used. Representative of the unsaturated monocarboxylic acids are acrylic acid, methacrylic acid, ethacrylic acid, crotonic acid, sorbic acid, hydrosorbic acid and cinnamic acid. Representative of unsaturated polycarboxylic acids are maleic acid, fumaric acid, itaconic acid, citraconic acid, mesaconic acid and aconitic acid.

The ethylenically unsaturated monomeric composition which is copolymerized with such unsaturated acids in the pre-formed latexes includes one or more monoethylenically unsaturated, copolymerizable monomers which form hydrophobic polymers and optionally an aliphatic conjugated diene.

The copolymerizable, ethylenically unsaturated compounds which as homopolymers or as copolymers with each other are hydrophobic are represented by, but not restricted to, non-ionic monoethylenically unsaturated monomers such as the alkenyl aromatic compounds, i.e., the styrene compounds, the derivatives of $\alpha$-methylene monocarboxylic acids such as the acrylic esters, acrylic nitriles and methacrylic esters; derivatives of $\alpha,\beta$-ethylenically unsaturated dicarboxylic acids such as maleic diesters; unsaturated alcohol esters; unsaturated ketones; unsaturated ethers; and other polymerizable vinylidene compounds such as vinyl chloride and vinylidene chloride. Specific examples of such ethylenically unsaturated compounds are styrene, $\alpha$-methylstyrene, ar-methylstyrene, ar-ethylstyrene, $\alpha$,ar-dimethylstyrene, ar,ar-dimethylstyrene, ar,ar-diethylstyrene, t-butyl-styrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl $\alpha$-chloroacrylate, diethyl maleate, dimethyl fumarate, diethyl itaconate, vinyl acetate, vinyl propionate, vinyl chloride, vinyl bromide, vinylidene chloride, vinylidene fluoride, vinyl methyl ketone, methyl isopropenyl ketone, and vinyl ethyl ether.

By the term "aliphatic conjugated diene" it is meant to include, typically, 1,3-butadiene, 2-methyl-1,3-butadiene, 2,3-dimethyl-1,3-butadiene, piperylene, 2-neopentyl-1,3-butadiene, and other hydrocarbon homologs of 1,3-butadiene, and, in addition, the substituted dienes, such as 2-chloro-1,3-butadiene, 2-cyano-1,3-butadiene, the substituted straight-chain conjugated pentadienes, the straight and branched-chain hexadienes, and the like. Usually the conjugated dienes have from 4 to 10 carbon atoms. The 1,3-butadiene hydrocarbons, and 1,3-butadiene and isoprene specifically, because of their ability to produce particularly desirable polymeric material, are preferred.

The aqueous dispersions used in the practice of this invention are conveniently prepared from the above-described monomers by conventional emulsion polymerization at acid pH using small amounts of conventional emulsifiers and free-radical producing catalysts usually in an amount from about 0.01 percent to about 3 percent based on the weight of the monomers under conventional conditions of agitation, time, pressure, and temperature, using either a batchwise, incremental or continuous type addition of the monomers, water and other constituents to a reaction vessel or to a series of such vessels or by polymerization in a coil reactor.

The catalysts are of the type which produce free radicals and conveniently are per-oxygen compounds; for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid — sometimes activated by water-soluble reducing agents such as a ferrous compound, sodium bisulfite or hydroxylamine hydrochloride — and other free radical producing materials such as 2,2'-azobisisobutyronitrile.

Emulsifiers, although not required for the invention, are often advantageously included in the aqueous dispersion for stabilization of the dispersion and/or to provide particle size control. Usually at least one anionic emulsifier is included and one or more of the known non-ionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well known emulsifiers, for the purpose of illustration and not for limitation, are dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate. Other species of useful anionic emulsifying agents will be known. Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, and long chain alkyl mercaptans; the alkylene oxides being reacted in a ratio such as 5 moles to 20 moles or higher such as up to 50 moles per mole of the coreactant. Similarly effective compounds are monoesters such as the reaction productse of a polyethylene glycol with long chain fatty acids, for example, glycerol monostearate, sorbitan trioleate, and partial and complete esters of long chain carboxylic acids with polyglycol ethers of polyhydric alcohols. By "long chain" in the above description usually is meant an aliphatic group having from six carbon atoms to 20 or more. Combinations of two or more emulsifying agents from one or more of the classes may be employed if desired for special effects.

The amount of emulsifier during polymerization usually is from about 0.05 part to about 5 parts preferably from about 0.5 part to about 3 parts, for each 100 parts of monomers on a weight basis.

Sometimes part or all of these surfactants are introduced into the polymerization mixtures as a component of a preformed seed latex. In such a process, to small amounts of a seed latex are added water, constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system being used, such temperatures usually being between about 0°C and 115°C.

Conventional additives for latex compositions may be included in small but usual amounts and in a known manner. Such materials include, but are not restricted to, chain transfer agents, short stopping agents, buffers, antifoaming agents, chelating agents, inorganic salts, additional surfactants, plasticizers, tinting materials, bactericides, or other preservatives and the like.

The aqueous dispersions, i.e., the latex compositions, usually are prepared at a solids content of from about 30 percent to about 70 percent, preferably from about 40 percent to about 55 percent by weight.

The additive method also encompasses embodiments in which the carbocyclic compound is added to other constituents of the composition before or during emulsion polymerization of the monomers to form the latex.

The amount of the carbocyclic compound which is effective to provide water-redispersibility usually is from about 1 part to about 10 parts, preferably from about 2 parts to about 8 parts, for each 100 parts of copolymer in the latex. Ordinarily the minimum proportion of carbocyclic compound would not be used with a latex containing the minimum amount of copolymerized carboxyl-containing monomer or with a latex having an average particle size near the smaller end of the particle-size range. The carbocyclic compound can be added either as the acid or as a water-soluble salt of the acid. However, when the pH of the latex is adjusted above 7 as described below, the carbocyclic compound will be, at least partially, in the water-soluble salt form.

The alternate in situ method of preparing compositions of this invention comprises the emulsion polymerization of the same kinds of monomers as noted above except that the aliphatic conjugated diene which is optional in the preparation of the pre-formed latex is a requirement in the in situ method and there is also required fumaric acid or a water-soluble monoalkyl ester of an ethylenically unsaturated dicarboxylic acid having from 4 to 5 carbon atoms. The monoalkyl esters are represented by the monomethyl, monoethyl and monopropyl esters of maleic acid, fumaric acid, itaconic acid and citraconic acid but the monomethyl esters are preferred and the especially preferred ester is monomethyl maleate. The amounts of the various components of the monomeric composition are from about 10 percent to about 97.5 percent, preferably from about 20 percent to about 75 percent, of the aliphatic conjugated diene, from about 2.5 percent to about 13 percent, preferably from about 4 percent to about 8 percent, of fumaric acid or of the monoalkyl ester, from 0 to about 87.5 percent, preferably from about 22 percent to about 76 percent, of a non-ionic monoethylenically unsaturated monomer and from 0 to about 8 percent of another $\alpha,\beta$-ethylenically unsaturated carboxylic acid, provided that the total amount of ethylenically unsaturated carboxyl-containing monomer is not greater than about 13 percent. It has been found that some of the monoalkyl ester or fumaric acid is used to form the carbocyclic compound in the "in situ method". The minimum amount of monoalkyl ester or fumaric acid ordinarily would be used only with the monomethyl esters, when another $\alpha,\beta$-ethylenically unsaturated carboxylic acid is also used or when polymerization conditions are chosen such that a large particle-sized latex is produced. Similarly, when the monoethyl, and especially the monopropyl, esters are used, the amount should be selected from the upper part of the range.

In the in situ method the prescribed monomers are polymerized under conventional emulsion polymerization conditions at acid pH and optionally with conventional added materials as summarized above. However, best results are obtained when the polymerization is carried out in a sequential manner such that the fumaric acid or alkyl monoester is present in the initial composition before polymerization conditions are generated, together with not more than about 80 percent of the aqueous phase and optionally with a small amount of seed latex, then the other monomeric constituents and the remainder of the aqueous phase together with the catalyst are added as separate streams either incrementally or continuously until all of the constituents have been added.

During the emulsion polymerization process, some of the monoalkyl ester is copolymerized with the other monomeric constituents and some of it reacts with the conjugated diene and hydrolysis occurs to form a tetrahydrophthalic acid. Thus, there is obtained a latex of a carboxyl-containing polymer in admixture with a six-membered carbocyclic compound having two vicinal carboxyl substituents. It appears that when a half ester of itaconic acid is used, a rearrangement occurs such that some of the same kind of product is obtained, i.e., a carbocyclic compound having carboxyl groups attached directly to adjacent ring-carbon atoms.

While the latex products of the foregoing description usually are used to prepare the warp sizing compositions of this invention, they may be converted to dry compositions and then subsequently dispersed in water with the other components of the warp sizing compositions as described below.

The latex products may be converted to dry compositions (which are redispersible in water to reform latex products having about the same particle size as the original latex) in several ways. For example, the latex composition may be cast on a suitable surface such as glass and allowed to dry at ambient temperature or at higher temperatures but less than 95°C, preferably not exceeding 60°C. Powdery products can be obtained by spray-drying or freeze-drying techniques. However, for good redispersibility the latex composition should have a pH value from about 7 to about 14, preferably from about 8 to about 12. If the pH of the composition is lower than about 7, sufficient water-soluble base should be added, before drying, to raise the pH to the desired value. Any of the water-soluble organic or inorganic base-acting compounds may be used such as the lower molecular weight amines, for example, methyl amine, ethyl amine, n-propyl amine, n-butyl amine, n-amyl amine and 2-aminoethanol; and the ammonium or alkali metal hydroxides such as ammonium hydroxide, lithium hydroxide, sodium hydroxide and potassium hydroxide. To assure continued redispersibility the dried products should not be heated above about 95°C.

The lubricant means required in the warp sizing compositions of this invention reduces fiber-to-yarn friction and loom-to-yarn friction during weaving. Suitable lubricant means are waxes or oils which are soluble, self-emulsifiable or at least emulsifiable in an aqueous medium. The lubricants are represented by tallow, paraffin wax, mineral oil, modified hydrocarbon oils, modified vegetable oils and proprietary materials often called softeners. The specific identity of the lubricant is not critical. The quantity used usually ranges from about 1 percent to about 15 percent by weight based on the weight of polymer in the warp sizing composition although a quantity within the range of from about 3 percent to about 7 percent is preferred.

The surfactant required for the instant warp sizing composition assists in the penetration of the sizing into the yarn. Since the polymer component of the warp sizing composition is prepared as an aqueous dispersion, part (or sometimes all) of the surfactant may be added during preparation of such aqueous dispersion. Often, however, an additional quantity is added during the preparation of the warp sizing composition from the aqueous dispersion of polymer in an amount of from about 0.5 percent to about 5 percent of the copolymer weight. The total amount of surfactant in the warp sizing composition ordinarily ranges from about 0.5 percent to about 7 percent of the copolymer weight.

The surfactant may be of the same kind described supra for inclusion in the aqueous dispersion of polymers which are used in the preparation of the warp sizing composition. In any event, the surfactant added during preparation of the warp sizing composition should be compatible with any surfactant which is already present in the aqueous dispersion of polymer and should be effective at the pH range in which it is prepared or will be used, i.e., at a pH from about 7 to about 14.

In addition to the required components of the warp sizing composition, a thickener is a commonly used optional component. The addition of thickeners increases the viscosity of the aqueous composition which in turn decreases penetration into the yarn and builds a heavier coating on the yarn surface. When a thickener is used, the quantity usually ranges from about 0.25 percent to about 15 percent of the polymer weight. Methyl cellulose in an amount of from 0.5 percent to about 7.5 percent of the polymer weight represents a preferred embodiment of thickener. The amount of thickener, if any, which is used depends somewhat on the solids content of the warp sizing composition. Various other additives may be included in the warp sizing composition, if desired, such as sodium silicate, fillers, defoamers, biocides, pH adjusting agents, and antistatic agents. Usually the solids content of the warp sizing composition ranges from about 2 percent to about 20 percent based on the total weight of the composition. The preferred normal compositions usually have from about 5 percent to about 15 percent solids although in some specialized areas up to about 16 percent are preferred. When waxes which are dispersed as large particles are used as lubricant, it is often advantageous to use a high shear mixer when blending the components of the warp-sizing composition.

A common method of preparation of the sizing composition is to mix the lubricant, any additional surfactant and the desired optional additives to the specified latex at the solids concentration at which the latex was prepared, such as from about 30 percent to about 70 percent, preferably from about 40 percent to about 55 percent. The resulting concentrated mixture is then diluted with water to the desired concentration for use. If desired in special circumstances, however, the latex can be diluted first. If a thickener is one of the optional ingredients, however, it is usually added after the dilution step. Furthermore, even though less commonly practiced, the redispersible latex may be converted to a dry composition and subsequently blended in an appropriate amount of water with the lubricant means, optionally with a surfactant and any other of the desired optional additives, to form a warp sizing composition of the desired concentration.

The sizing process usually is carried out at ambient temperature by passing the warp through a size box or trough containing the warp-size composition, removing excess warp-size with squeeze rolls and drying the treated yarn over heated rolls or in an oven. Either before or after drying the warp, the individual yarns (ends) are separated from one another by a series of bars known as split rods or lease rods. The thus sized warp is separated at the lease rods, wound on a loom beam then mounted on a loom after which the individual ends are drawn into the desired pattern. While the amount of size applied varies to some extent with the construction and type of yarn, the amount usually is in the range of from about 1 percent to about 15 percent (dry basis) of the weight of the yarn.

The warp sizing compositions of this invention are particularly advantageous for application to textile yarns, which may be, for example, continuous filament yarns, spun yarns, or fasciated yarns from natural or synthetic fiber. The fiber component of these yarns is represented by polyesters such as of the polyethylene terephthalate type, polyester blends with cellulosics, polyamides (nylons), polyacrylonitrile, polyvinylidene chloride, polyvinyl chloride, polyethylene, polypropylene and modified natural materials such as cellulose acetate and rayon or natural materials such as wool and cotton.

The warp sizing compositions of this invention provide a number of advantageous properties. The sizing compositions require no cooking. The amount of hydrophobic and rubber character provided by the polymeric component results in advantages in the sizing composition, in the sized product and to the sizing process. The aqueous dispersion has a desirably low viscosity without requiring the use of high temperatures. Thus, there is a low evaporation rate from the bath. Because of the properties of the warp sizing composition, the sized yarns can be woven at low relative humidity since water is not required for plasticization. That characteristic simplifies the humidification requirements for the installation and results in greater operator comfort and lower corrosion rates for the equipment. The polymer component has a low affinity for water resulting in less energy being required to dry the sized yarns. Additionally, the sized yarns can be desired readily after weaving. In the desizing step, a surfactant may be used which will allow desizing and scouring at the same time. Furthermore, removal of the polymeric component of the new sizing composition from waste water arising from the sizing or desizing process can be facilitated through coagulation or precipitation of the polymer from dispersion by use of trivalent metal ions.

In the examples provided hereinafter, the desizing test was carried out as follows. A supply of water is prepared by adding sufficient calcium and magnesium ions to deionized water to provide 150 ppm hardness. For each 100 parts of the resulting water there is added 0.5 part of alkanol H.C.S. (a condensate of ethylene oxide and a long chain alcohol) and 2.0 parts of sodium tripolyphosphate. The resulting desizing formulation is introduced into the beakers of a "Terg-O-Tometer" which is a thermostatically controlled constant temperature bath in which four separate 2-liter breakers are mounted, each fitted with a motor-driven agitator of scaled proportions. The temperature is adjusted to 120°F and the agitation to 100 cpm. The sized samples to be tested, along with an unsized sample of the same material as a contro l, are washed for 30 minutes, then rinsed for 10 minutes. The percentage of desize is then calculated according to the loss in weight from the desizing process taking into consideration the weight loss of the unsized sample subjected to the same treatment.

The effectiveness of the sizing is determined in the following examples with an entanglement tester for the yarns. The testing device is designed to copy the shedding action of a loom. The yarns are passed through heddles and then clamped under 44 grams tension. The machine is cycled at 100 picks per minute and the amount of yarn entangled is measured at 5, 10, 20 and 40 minutes of operation.

The entanglement tester accommodates 39 ends which are clamped at 46½ inches of length and ½ inch in width. There are spacers 0.010 inch thick to maintain even spacing of yarn. Weights are used on one end of the yarn to obtain the correct tension until the yarn is clamped in place. The shed height is 3¾ inches. During the shedding motion, the yarn is stretched 0.32 percent.

Data are obtained by stopping the drive and measuring the quantity of yarn entangled. To compensate for random entanglement, the length and number of ends entangled are measured at six consecutive positions of the machine at maximum shed height. The first ¾ inch of yarn is not measured because the yarns are so close that entanglement cannot be judged. The total entanglement is then calculated by summing the products of the ends multiplied by the inches entangled at each position and then dividing that total by 6 positions. This number is converted to the fraction entangled by dividing the product of 39 ends and 46½ inches minus the 1½ inches excluded from the entanglement measurement. This fraction is converted to percent by multiplying by 100. The effectiveness of the size is inversely related to the percentage of entanglement.

The following examples are given to illustrate more clearly the principle and practice of this invention to those skilled in the art and are not for purposes of limitation. Throughout the specification and claims, all parts and percentages are by weight unless otherwise indicated.

EXAMPLES 1-10

Sizing composition J is prepared from a latex containing a copolymer of 68 percent of styrene, 30 percent of butadiene and 2 percent of monomethyl maleate and also containing 0.6 part of an anionic surfactant, the sodium salt of dodecyldiphenyl ether disulfonic acid and 4 parts of 1,2,3,6-tetrahydrophthalic acid in the form of its sodium salt by blending with each 100 parts (solids basis) of the latex, 3 parts (solids basis) of a synthetic wax (Nopco DS-101) having a melting point of about 220°F as lubricatnt in the form of an aqueous emulsion at 40 percent solids and as additional surfactant 1 part of a nonionic surfactant, alkylphenoxypoly(ethyleneoxy)ethanol (Igepal CO210). The resulting composition is then diluted with water to a solids content of 10 percent.

Sizing compositions K and L are prepared in the same manner and with the same materials except that the amount of synthetic wax (solids basis) is 5.0 parts and 10.0 parts respectively. Thickeners are added as shown in Table I.

Yarns of 50/50 polyesterIcotton, 18 singles, 4.5 twists per inch, are sized using a laboratory slasher (Calloway Slasher, U.S. Pat. No. 2,432,270) with the drum roll temperature set at 200°F, the rear radiant heater set at 150°F, the front radiant heater set as shown in Table I and the sizing box at ambient temperature using 140 ends and dry split. Other deviations for a particular example are shown in Table I under comments. The results of the entanglement test as described supra, the coefficient of friction of the sized yarns and the size add-on, in percent, are shown in Table II. For comparative purposes, data are also shown for the unsized yarn, (F).

Comparative Materials A–E

For comparison, data are shown in Tables I and II for other portions of the same yarn which are sized using commercially formulated warp sizes of the types:

X = polyvinylalcohol

Y = sodium carboxymethylcellulose

The sizing process for these comparative materials is carried out in the same manner as for the examples except that the size box temperature is 160°F for all of the comparative materials and the rear radiant heater for A, B and C is set at 180°F rather than 150°F and for A the drum roll temperature was set at 250°F.

persibility of the copolymer residue obtained by drying the aqueous colloidal dispersion at a pH of from about 7 to about 14 and (b) a lubricant; said sizing composition also containing from about 0.5 percent to about 7 percent, based on the copolymer weight, of a surfactant.

TABLE I

| Ex. No. | arp Size | Thickener Parts | Kind | Running Conditions Front Heater °F | Speed Yd/Min | Running | Comments Splitting | Other |
|---|---|---|---|---|---|---|---|---|
| 1 | J | 2.5 | (a) | off | 18 | good | fair/good | |
| 2 | K | none | | off | 18 | excellent | excellent | |
| 3 | L | none | | off | 18 | excellent | excellent | |
| 4 | K | 1.0 | (b) | off | 18 | excellent | excellent | |
| 5 | K | 1.0 | (a) | off | 18 | excellent | fair/good | |
| 6 | K | none | | off | 18 | excellent | excellent | Size has 12.5% solids |
| 7 | K | none | | 180 | 40 | excellent | excellent | Size has 12.5% solids |
| 8 | K | none | | off | 18 | excellent | excellent | 3.0 parts non-ionic surfactant |
| 9 | K | none | | off | 18 | excellent | excellent | No non-ionic surfactant |
| 10 | K | none | | 180 | 40 | excellent | excellent | No non-ionic surfactant |
| A* | X | | | 180 | 18 | good | good | |
| B* | X | | | off | 18 | good | good | |
| C* | X | | | 180 | 40 | did not dry | — | |
| D* | Y | | | 180 | 18 | excellent | excellent | |
| E* | Y | | | 180 | 40 | did not dry | — | |

*not examples of the invention
(a) a commercial thickener of hydroxypropyl methylcellulose
(b) a commercial thickener of hydroxyethyl cellulose

TABLE II

| Ex. No. | Size Add-on % | Coefficient of Friction | Entanglement at cumulative time/minutes | | | |
|---|---|---|---|---|---|---|
| | | | 5 | 10 | 20 | 40 |
| 1 | 12.7 | X | 0 | 0 | 0.17 | 0.04 |
| 2 | 10.4 | 0.24 | 0 | 0 | 0.81 | 0.59 |
| 3 | 15.0 | X | X | X | X | X |
| 4 | 13.7 | 0.31 | X | X | X | X |
| 5 | 13.7 | X | X | X | X | X |
| 6 | 12.2 | 0.29 | .95 | .04 | 1.25 | 0.11 |
| 8 | 11.3 | 0.21 | 0.41 | 0.63 | 1.42 | .42 |
| 9 | 8.7 | 0.19 | 0.05 | .70 | 1.31 | .80 |
| A* | 11.0 | 0.33 | 1.3 | 1.6 | 1.12 | 0.91 |
| B* | 11.0 | X | X | X | X | X |
| D* | 8.5 | 0.40 | 0.95 | 0.77 | 1.56 | 1.71 |
| F* | none | 0.27 | 4.77 | 8.99 | 11.28 | X |

X—not determined
*—not examples of the invention

Samples of yarn from all of the examples and for each of the comparative materials are found to desize essentially completely when subjected to the desizing procedure described supra.

We claim:

1. A textile yarn sizing composition comprising (a) an aqueous colloidal dispersion containing (1) a film-forming copolymer of from about 1 percent to about 10 percent of an α,β-ethylenically unsaturated carboxylic acid and the balance of an essentially water-insoluble, ethylenically unsaturated monomer composition and (2) a six-membered carbocyclic compound having two vicinal carboxyl groups which is soluble in aqueous alkaline media in an amount sufficient to provide redispersibility of the copolymer residue obtained by drying the aqueous colloidal dispersion at a pH of from about 7 to about 14 and (b) a lubricant; said sizing composition also containing from about 0.5 percent to about 7 percent, based on the copolymer weight, of a surfactant.

2. The sizing composition of claim 1 which also includes a thickener.

3. The sizing composition of claim 1 in which the amount of carboxyclic compound is from about 2 parts to about 8 parts for each 100 parts of copolymer.

4. The sizing composition of claim 1 in which the α,β-ethylenically unsaturated carboxylic acid comprises from about 3 percent to about 5 percent of the copolymer.

5. The sizing composition of claim 1 in which the carboxyclic compound is a phthalic acid.

6. The sizing composition of claim 1 in which the copolymer contains a copolymerized aliphatic conjugated diene.

7. The sizing composition of claim 6 in which the aliphatic conjugated diene is butadiene.

8. The sizing composition of claim 6 in which the copolymer also contains a copolymerized alkenyl aromatic compound.

9. The sizing composition of claim 8 in which the alkenyl aromatic compound is styrene.

10. The sizing composition of claim 6 in which the carboxyclic compound is a tetrahydrophthalic acid.

11. An article of manufacture comprising the dried sizing compound of claim 1 deposited on a textile yarn.

12. The article of claim 11 in which the textile yarn contains synthetic fiber.

* * * * *

UNITED STATES PATENT AND TRADEMARK OFFICE
CERTIFICATE OF CORRECTION

PATENT NO. : 3,909,477
DATED : September 30, 1975
INVENTOR(S) : Norman L. Madison, et al.

It is certified that error appears in the above-identified patent and that said Letters Patent are hereby corrected as shown below:

Column 2, line 55, the word "or", second instance, should read --on--.

Column 5, line 16, "ductse" should read --ducts--.

Column 9, line 40, the word "breakers" should read --beakers--.

Column 10, line 32, the word "lubricatnt" should read --lubricant--; same column, line 43, the word "polyesterl" should read --polyester--.

In Table I, second column heading should read --Warp Size--; not arp Size.

In Table II, fourth column heading should read --Entanglement % at cumulative time/minutes--; not "Entanglement at cumulative time/minutes."

Column 12, line 34, the word "carboxyclic" should read --carbocyclic--; same column, line 41, the word "boxyclic" should read --bocyclic--; same column, line 53, the word "carboxyclic" should read --carbocyclic--.

Signed and Sealed this third Day of February 1976

[SEAL]

Attest:

RUTH C. MASON
Attesting Officer

C. MARSHALL DANN
Commissioner of Patents and Trademarks